United States Patent [19]
Köninger et al.

[11] Patent Number: 4,514,071
[45] Date of Patent: Apr. 30, 1985

[54] DEVICE FOR COUPLING THE SHAFTS OF TRANSPORTING UNITS IN DEVELOPING MACHINES OR THE LIKE

[75] Inventors: Horst Köninger, Munich; Klaus Lehnert, Unterhaching; Günter Schirk, Munich, all of Fed. Rep. of Germany

[73] Assignee: AGFA Gevaert Aktiengesellschaft, Leverkusen, Fed. Rep. of Germany

[21] Appl. No.: 496,448

[22] Filed: May 20, 1983

[30] Foreign Application Priority Data

May 28, 1982 [DE] Fed. Rep. of Germany ....... 3220236

[51] Int. Cl.³ .......................... G03B 3/08

[52] U.S. Cl. .......................... 354/320; 226/189; 403/359; 464/88

[58] Field of Search ............... 354/316, 319, 320, 321, 354/322; 226/188, 189; 192/67 R; 403/300, 301, 359; 464/88, 153, 154, 158

[56] References Cited

U.S. PATENT DOCUMENTS 2,918,809 12/1959 Miller .......................... 464/88
2,952,143 9/1960 Case .......................... 464/88
3,243,973 4/1966 Kraeling .......................... 464/154
3,588,154 6/1971 Voight et al. .......................... 464/158
4,416,529 11/1983 Kastl .......................... 354/320

*Primary Examiner*—A. A. Mathews
*Attorney, Agent, or Firm*—Peter K. Kontler

[57] ABSTRACT

A coupling device for transmitting torque from a first film transporting rack to a neighboring second film transporting rack in a developing machine has a first shaft extending outwardly from a sidewall of one of the racks, a second shaft which extends outwardly from one sidewall of the other rack and is movable into axial alignment with the first shaft, first and second gears on the respective shafts, and a sleeve having an internal gear which is in permanent mesh with one of the gears and is movable axially into and from mesh with the other gear. The sleeve has internal elastic prongs which extend into a circumferential groove of the shaft for the one gear when the internal gear meshes with the other gear.

20 Claims, 6 Drawing Figures

DEVICE FOR COUPLING THE SHAFTS OF TRANSPORTING UNITS IN DEVELOPING MACHINES OR THE LIKE

BACKGROUND OF THE INVENTION

The present invention relates to couplings in general, and more particularly to improvements in coupling devices which can be used with advantage in photographic developing and like machines. Still more particularly, the invention relates to improvements in coupling devices which can be used to transmit torque from a first transporting unit to a second transporting unit in the vessel containing a developing solution, a fixing bath, a rinsing bath, a gaseous drying fluid and/or other media which are to treat continuous webs or discrete sheets of photosensitive material, such as photographic films, photographic paper, exposed film which issues from a photocomposing machine, or the like.

German Pat. No. 14 97 395 discloses a developing machine which can treat roll films of predetermined width. The machine comprises a series of tanks each of which contains a different fluid. The patented developing machine further comprises film transporting units in the form of so-called racks having a width corresponding to the width of films which are to be treated in the machine. The racks are removably inserted into the tanks and are disposed one after the other so that successive increments of a film advance through successive baths by advancing along paths which are defined by the racks in the respective tanks. Each of the racks is provided with a discrete drive which can receive motion from a central driving unit of the developing machine. The width of each rack corresponds to that which is needed to treat roll films of maximum width (105 mm) presently available on the market and demanded by the users of films. The very wide films are used in X-ray laboratories of private physicians, hospitals, nursing homes and similar institutions. However, the trend in X-ray laboratories is toward the use of narrower roll films, namely, 35 mm or 16 mm film, due to transition from the taking of still pictures to the making of motion pictures. In addition to 35 mm or 16 mm film, an X-ray laboratory is likely to use also films having a width of 100, 90 or 70 mm. In certain other branches, such as in the fields where information is stored on microfilm, the customary film widths are 8, 16 and 35 mm. The same holds true for amateur photography.

The processing of each type of film (i.e., of each film having a given width) necessitates the use of a different set of racks. This is necessary in order to ensure adequate guidance of films through successive treating stations in a developing machine. Another problem which is encountered in conventional developing machines is that the establishment of connections between a central driving unit and the driving units of discrete racks takes up much time and that such connections are complex, costly and sensitive. Moreover, proper connections can be established only by resorting to parts which are produced with a high degree of precision and only if the racks are installed in the respective tanks with a high or very high degree of accuracy. Still further, the patented developing machine is not designed for simultaneous treatment of wider, narrower, highly sensitive and less sensitive films, photographic paper or like photosensitive materials.

Commonly owned copending U.S. patent application Ser. No. 372,102, filed Apr. 27, 1982 now U.S. Pat. No. 4,416,529 granted Nov. 22, 1983 by Alfons Kastl, discloses a developing machine which is capable of simultaneously processing several films each of which has a different width, some of which have different widths or all of which have the same width. The machine which is disclosed in the application Ser. No. 372,102 employs racks of different widths which can be placed one next to the other and whose mobile parts can receive motion from a common driver unit in such a way that the common driver unit transmits torque to an input element of a first rack, an output element of the first rack transmits torque to the input element of the neighboring rack, and so forth. To this end, the machine of the application Ser. No. 372,102 employs special coupling devices each of which is designed to separably couple a shaft in a first rack to a shaft in the neighboring second rack. It has been found that, in addition to numerous important advantages, the coupling devices which are used in the machine of the application Ser. No. 372,102, also exhibit a drawback, namely, they do not permit for movement of neighboring racks at right angles to the axes of the aforementioned shafts, i.e., the placing of racks next to each other necessitates the movement of one rack toward the other rack in the direction of the axes of shafts which are to be coupled to each other. This entails that the compartments of a single tank or the compartments of discrete tanks cannot be filled to capacity, i.e., each compartment must leave room for movement of the last-inserted rack away from the neighboring rack in order to allow for separation of such neighboring racks from each other.

OBJECTS AND SUMMARY OF THE INVENTION

An object of the invention is to provide a novel and improved coupling device which can establish or terminate a torque transmitting connection between two shafts in a simple, time-saving and inexpensive way.

Another object of the invention is to provide a coupling device which can be used with particular advantage to establish or terminate a torque transmitting connection between the shafts of two neighboring transporting units or racks in developing machines for strip-shaped or sheet-like photosensitive material.

A further object of the invention is to provide a coupling device which is constructed and assembled in such a way that, in order to be separated from one another, two neighboring racks need not be moved in the direction of the axes of their shafts.

An additional object of the invention is to provide a coupling device which renders it possible to insert upright racks with horizontal shafts from above into a vessel and to withdraw such racks from the vessel by moving them vertically, i.e., in a direction at right angles to the axes of shafts which must be coupled to each other.

Still another object of the invention is to provide a coupling device which allows for more satisfactory filling of vessels with film transporting racks than heretofore known coupling devices.

A further object of the invention is to provide a coupling device which can be activated or deactivated with little loss in time, with a minimum of effort and by skilled, semiskilled or unskilled persons.

An additional object of the invention is to provide a coupling device which automatically compensates for manufacturing tolerances or some misalignment of parts which are to be coupled to one another.

Another object of the invention is to provide a coupling device which can readily stand the action of fluids of the type used in developing machines for photosensitive materials.

The invention is embodied in a coupling device, particularly for use in developing machines for photographic films, photographic paper, X-ray films and other photosensitive materials. The coupling device comprises at least substantially coaxial first and second shafts, first and second gears provided on the respective shafts, a sleeve having an internal gear meshing with the first gear and movable axially of the shafts between first and second positions in which the internal gear respectively meshes with and is out of mesh with the second gear, and means for releasably holding the sleeve in the first position. One of the shafts can be moved away from or laterally of the other shaft in the second position of the sleeve.

The pitch diameter of the internal gear preferably matches or closely approximates the pitch diameters of the first and second gears. This reduces the cost of the coupling device because the first gear can be identical with the second gear and the internal gear can have a constant pitch diameter all the way from the one to the other of its axial ends.

The coupling device can further comprise or form part of a first transporting unit having a wall rotatably mounting the first shaft so that the first gear is disposed externally of the first transporting unit, and a second transporting unit having a wall rotatably supporting the second shaft so that the second gear is located externally of the second transporting unit. The sleeve is then disposed between the walls of the first and second transporting units, and either of the transporting units can be moved away from the other transporting unit when the sleeve is moved to its second position. Such sleeve can constitute a hollow cylinder with a knurled or otherwise roughened external portion to facilitate axial shifting of the sleeve between its first and second positions.

The first shaft includes a portion which extends beyond the first gear and toward the second shaft, and the holding means can comprise male and female detent elements. One of these elements is provided in the sleeve and the other detent element is provided on the aforementioned portion of the first shaft so as to be engaged by the one detent element when the sleeve is held in the first position.

In accordance with a presently preferred embodiment of the improved coupling device, the first shaft comprises a first portion at one side and a second portion at the other side of the first gear, and the combined axial length of the first and second portions plus the axial length of the first gear preferably matches or approximates the axial length of the sleeve. The coupling device can further comprise a wall rotatably mounting the first shaft so that the first and second portions of the first shaft and the first gear are disposed at one side of the wall. The sleeve is respectively remote from and close to the wall when it assumes its first and second positions. The axial length of the first portion can equal or closely approximate the axial length of the second portion of the first shaft, i.e., the first gear can be provided centrally of that part of the first shaft which includes the first and second portions and extends from the wall.

The sleeve can be provided with an internal (preferably annular) partition which is disposed between the first and second gears. The internal gear then comprises a first portion having a first axial length, disposed at one side of the partition and in permanent mesh with the first gear, and a second portion of lesser axial length which is disposed at the other side of the partition and meshes with the second gear in the first position of the sleeve. The axial length of the second portion of the internal gear can equal or approximate the axial length of the second gear. This, the extent of axial movement of the sleeve between its first and second positions can equal or only slightly exceed the axial length of the second gear.

The holding means can comprise one or more springy projections in the form of elastically deformable fingers or prongs which extend and tend to move radially inwardly of the sleeve (preferably radially inwardly from the aforementioned annular partition), and the first shaft then comprises a portion which engages with such projections in the first position of the sleeve. The just mentioned portion of the first shaft can have a circumferentially complete annular groove for arcuate portions of the projections; such arcuate portions extend into the groove in the first position of the sleeve but are automatically withdrawn from the groove when the sleeve is caused to leave its first position. Thus, the projections (with or without the partition) can be said to constitute the aforementioned male detent element, and the grooved portion of the first shaft can be said to constitute the female detent element of the holding means.

The sleeve preferably consists (at least in part) of a suitable synthetic plastic material. The partition and the projections of the holding means can constitute integral parts of the sleeve; such composite sleeve can be produced by resort to an injection molding or other suitable technique.

The axial length of the first gear can equal or approximate the axial length of the second gear; as mentioned above, the first and second gears can be identical to thus reduce the manufacturing cost. However, it is equally within the purview of the invention to provide a second gear whose diameter and/or axial length deviates from the corresponding measurements of the first gear and to use a sleeve having a composite internal gear one portion of which is dimensioned to permanently mesh with the first gear and another portion of which is dimensioned to mesh with the second gear in the first position of the sleeve.

The novel features which are considered as characteristic of the invention are set forth in particular in the appended claims. The improved coupling device itself, however, both as to its construction and its mode of operation, together with additional features and advantages thereof, will be best understood upon perusal of the following detailed description of certain specific embodiments with reference to the accompanying drawing.

DESCRIPTION OF THE PREFERRED EMBODIMENTS

Figure 2:
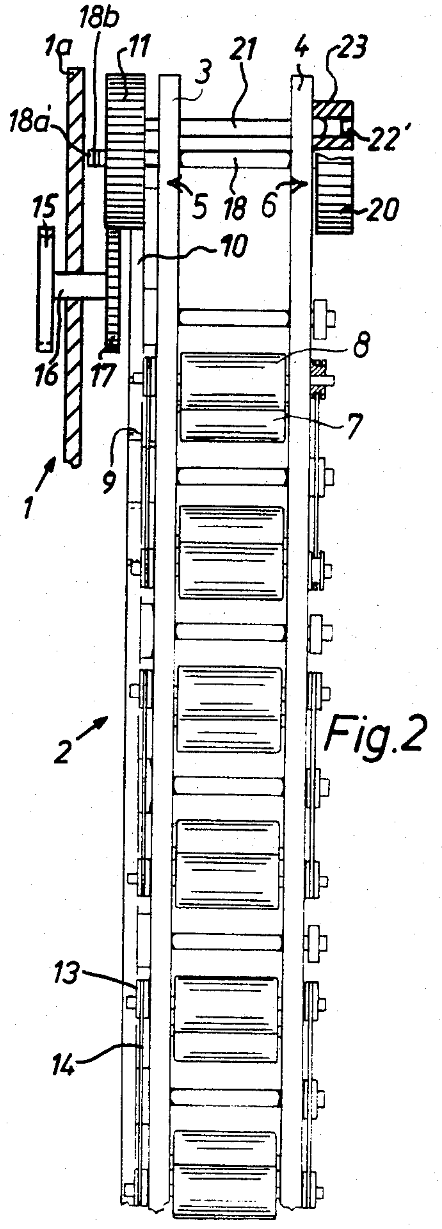
FIG. 2 is a fragmentary end elevational view of a transporting unit, substantially as seen in the direction of arrows from the line II—II in FIG. 1.
Figure 1:
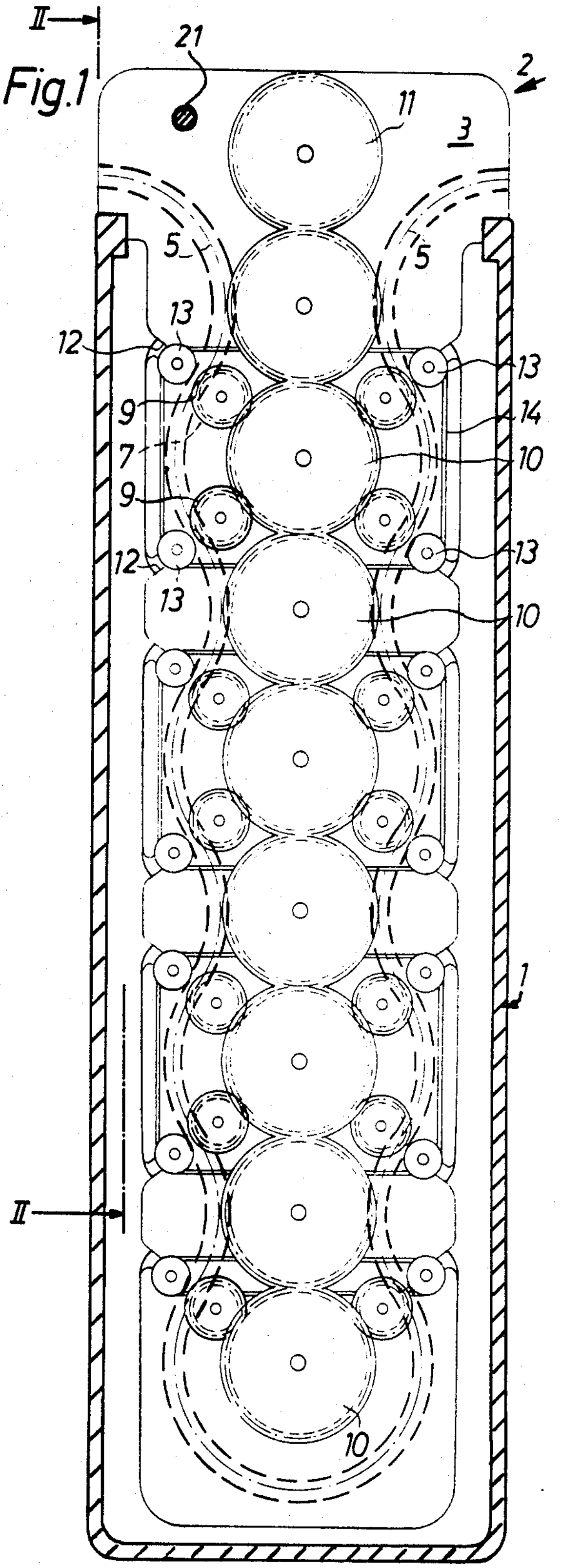
FIG. 1 is a vertical sectional view of a developing machine, substantially as seen in the direction of arrows from the line I—I of FIG 3, which employs coupling devices embodying the present invention and serving to transmit torque between the rotary elements of neighboring transporting units in the vessel of the developing machine.
Figure 3:
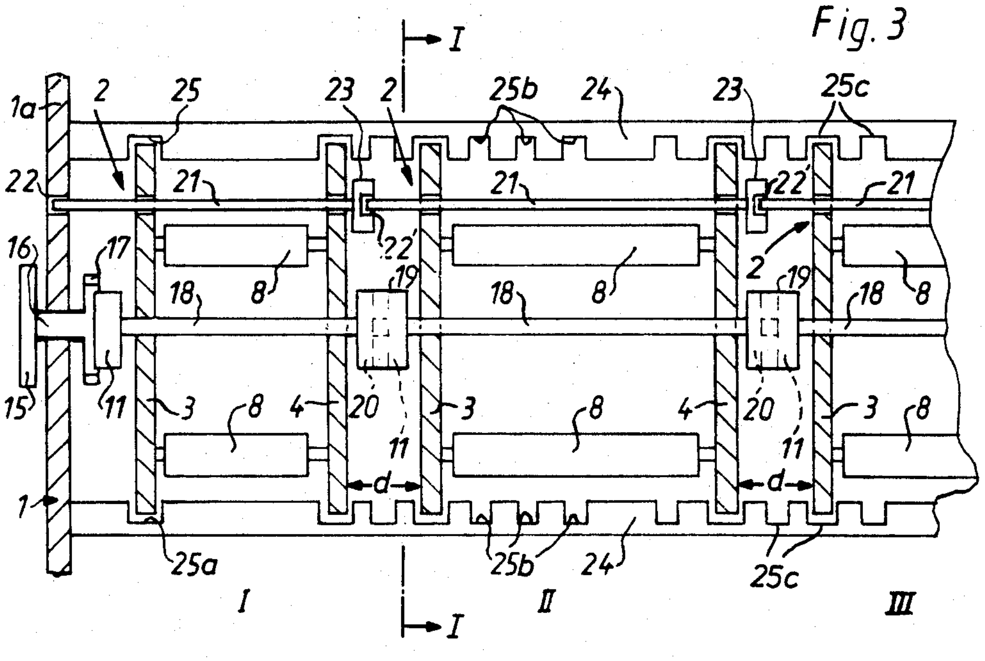
FIG. 3 is a fragmentary plan view of the developing machine including transporting units of the type shown in FIG. 2.

Referring to FIGS. 1 to 3, there is shown a portion of a developing machine for X-ray films, photographic films, photographic paper or analogous strip- or sheet-shaped photosensitive materials. The machine comprises a vessel 1 (e.g., an open-top tank having a rectangular cross-sectional outline) and several inserts 2 (also called racks) each of which constitutes a discrete film transporting unit. FIG. 3 shows three racks 2 which are inserted into the vessel 1 from above and are disposed side-by-side.

Each rack 2 comprises two parallel upright sidewalls 3 and 4 which are connected to each other by sets of distancing elements (not shown). The distance between the sidewalls 3, 4 of a rack 2 is slightly less than the width of the photosensitive material which is to be transported therethrough. To this end, the inner sides of the sidewalls 3, 4 (namely, those sides which face each other) are respectively provided with registering guide grooves 5 and 6 which receive the marginal portions of running webs or marginal portions of discrete sheets. These grooves define a substantially U-shaped path (see particularly FIG. 1 which shows a complete groove 5) but the upright legs or flanges of such path are preferably undulated to prolong the period of dwell of each increment of a web or sheet in contact with the medium (e.g., a developing solution, a fixing bath, a rinsing bath or a gaseous drying fluid) which fills or is caused to flow through the respective compartment of the vessel 1. The upper end portions of the guide grooves 5 and 6 are substantially horizontal so that one thereof allows for introduction and the other thereof allows for discharge of successive webs or sheets from the respective rack 2.

The sidewalls 3 and 4 of each rack 2 further support pairs of cooperating advancing rolls 7 and 8 which are adjacent to those portions of the undulate legs of the respective U-shaped path where the advancing webs or sheets change the direction of their travel, i.e., where a convex path portion merges into a concave path portion and vice versa. The advancing rolls 7 are disposed at the inner side of the respective U-shaped path and their stub shafts extend into bores of the sidewalls 3, 4 so that each advancing roll 7 is rotatable about a fixed axis. At least one stub shaft of each advancing roll 7 extends outwardly beyond the respective sidewall 3 or 4 and carries a gear 9 in mesh with an adjacent larger-diameter gear 10 rotatably mounted at the outer side of the respective wall 3 or 4. As can be seen in FIG. 2, the rack 2 which is illustrated therein is constructed in such a way that the gears 10 are adjacent to the outer side of the sidewall 3 and that each of the advancing rolls 7 carries a single gear 9. The neighboring gears 10 at the outer side of the sidewall 3 form a row of mating gears (see FIG. 1) and the diameters of all gears 10 are the same. This also holds true for the gears 9.

The guide rolls 8 are disposed at the outer side of the U-shaped path which is defined by the guide grooves 5, 6 and their stub shafts extend into open slots or channels 12 which are machined into or otherwise formed in the sidewalls 3 and 4. This enables the advancing rolls 8 to move sideways toward and away from the associated advancing rolls 7. At least one stub shaft of each advancing roll 8 carries a pulley 13 which is outwardly adjacent to the sidewall 3 or 4. The pulleys 13 of successive groups of four advancing rolls 8 (one such group of four rolls 8 is provided for each gear 10, see FIG. 1) are engaged by discrete endless elastic belts or bands 14 which urge the rolls 8 against the associated rolls 7 so that the rolls 8 are rotated by the neighboring rolls 7 when the path which is defined by the guide grooves 5, 6 is empty and that the rolls 8 are rotated by the advancing web or sheet of photosensitive material when such material is caused to advance through the respective rack 2.

That rack 2 which is adjacent to one sidewall 1*a* of the vessel 1 (see FIGS. 2 and 3) is separably connected with a torque-transmitting input unit which is driven by a suitable prime mover (not shown), e.g., by a variable-speed electric motor. The input unit comprises a first gear 15 which is driven by an internally toothed belt (not shown) and is installed at the outer side of the sidewall 1*a*. The shaft 16 of the gear 15 extends through the sidewall 1*a* and into the interior of the vessel 1 and drives a gear 17 which is disposed in the vessel and can drive a main driver gear 11 of the rack 2. The main driver gear 11 meshes with the nearest gear 10 of the rack 2 as well as with the gear 17 when the rack is properly inserted into the vessel 1 so that its sidewall 3 is adjacent to but still spaced apart from the sidewall 1*a* of the vessel and the gear 11 is aligned with and disposed above the gear 17 on the shaft 16. The axial length of the gear 11 preferably exceeds the combined axial length of the adjacent gear 10 and the gear 17 (see FIG. 2).

Figure 5:
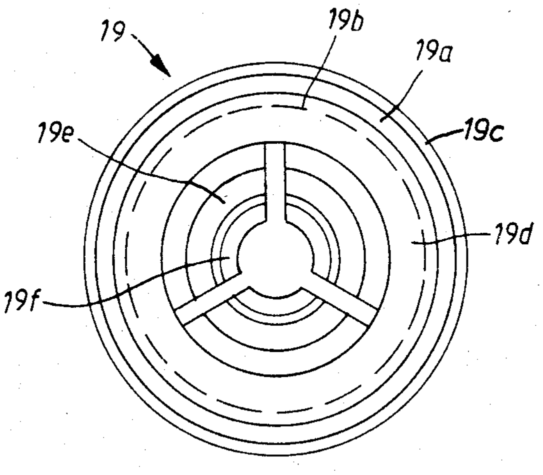
FIG. 5 is an end elevational view of the sleeve in the coupling device of FIGS. 4*a* and 4*b*.
Figure 4A:
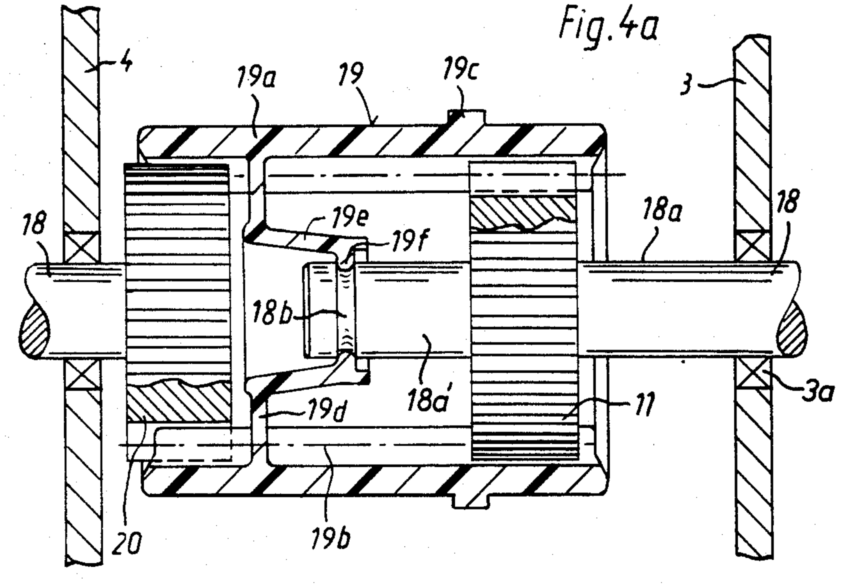
FIG. 4*a* is an enlarged partly elevational and partly axial sectional view of a coupling device which embodies the invention, the sleeve being shown in the first position in which its internal gear meshes with the gears of two coaxial shafts.
Figure 4B:
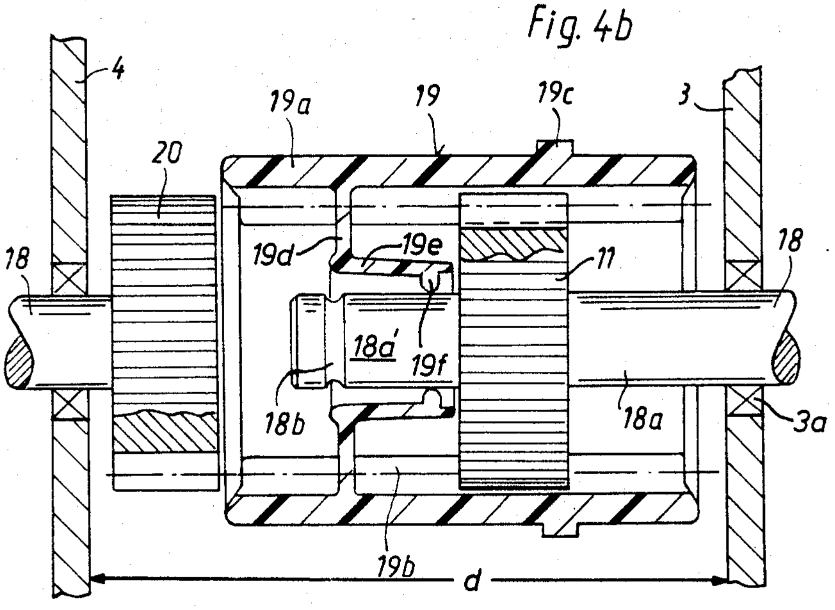
FIG. 4*b* is a similar partly elevational and partly axial sectional view of the coupling device but showing the sleeve in the second position in which the internal gear is disengaged from the gear on one of the shafts.

The main driver gear 11 of the rack 2 of FIG. 2 is mounted on a shaft 18 which is parallel to the advancing rolls 7, 8 and extends through the respective sidewalls 3, 4 so that a part thereof is disposed outwardly of the sidewall 4. The gear 11 is outwardly adjacent to the sidewall 3. The part of the shaft 18 which extends beyond the sidewall 4 carries a gear 20 which is preferably (but not necessarily) identical with the gear 11 and which can transmit torque to the gear 11 of a neighboring second rack 2 in a manner forming part of the present invention. The shaft 18 and the gear 20 can be said to form part of the improved coupling device the details of which are illustrated in FIGS. 4*a*, 4*b* and 5.

FIGS. 2 and 3 show that each rack 2 comprises a centering or locating pin or rod 21 which extends through the respective sidewalls 3, 4. One end portion of the centering pin 21 of the leftmost rack 2 of FIG. 3 extends into a hole or bore 22 of the adjacent sidewall 1*a* of the vessel 1 under the action of a spring (not shown), and the other end portion of the pin 21 carries a head 23 which is outwardly adjacent to the sidewall 4 and has a blind bore or socket 22′ for the left-hand end portion of the centering pin 21 of the second or median rack 2. The right-hand end portion of the centering pin 21 of the median rack 2 of FIG. 3 also carries a head 23 with a socket 22' for the left-hand end portion of the centering pin 21 in the third or rightmost rack 2 of FIG. 3, and so forth.

FIG. 3 further shows that the vessel 1 comprises parallel partitions 24 which extend transversely of the sidewall 1*a* and one side of each of which has suitably distributed vertically extending grooves 25 for reception of the adjacent marginal portions of the sidewalls 3, 4 of the three racks 2 respectively occupying the positions I, II and III. The grooves 25 of the upper partition 24 of FIG. 3 face the grooves 25 of the lower partition, and these partitions define one compartment of the vessel 1, e.g., a compartment containing a supply of developing solution. The partitions 24 extend all the way from the illustrated sidewall 1*a* to the other sidewall (not shown) of the vessel 1. The width of the grooves 25 equals or slightly exceeds the thickness of the sidewalls 3, 4. The distribution of grooves 25 in the partitions 24 depends on the dimensions of the racks 2 which are to be used in the developing machine including the vessel 1. Thus, each of the partitions 24 has a groove 25*a* nearest to the illustrated sidewall 1*a*, and the distance between such groove 25*a* and the sidewall 1*a* is selected in such a way that, if the sidewall 3 of any selected rack 2 is inserted into the registering grooves 25*a* of the two partitions 24, the main driver gear 11 of such rack automatically meshes with the gear 17 of the input unit including the gears 15, 17 and shaft 16. It is assumed that the vessel 1 of FIG. 3 is to be used or can be used with six different types of racks, namely, with racks wherein the distance between the sidewalls 3, 4 matches any one of six different values. Therefore, the partitions 24 are formed with groups of six grooves 25*b* which are adjacent to but spaced apart from the respective grooves 25*a* in order to allow for replacement of the leftmost rack 2 of FIG. 3 with any one of five other racks each having sidewalls 3, 4 disposed at a different distance from one another. The grooves 25*b* in each of the partitions 24 are followed by a set of grooves 25*c* and so forth. The distribution of grooves 25*c* with reference to the grooves 25*b* is such that the right-hand sidewall 4 of the leftmost rack 2 is disposed at a predetermined distance d from the left-hand sidewall 3 of the second or median rack 2 of FIG. 3, that the right-hand sidewall 4 of the second rack 2 is disposed at the same predetermined distance d from the left-hand sidewall 3 of the third rack 2, and so forth. The distance d is uniform for reasons which will be appreciated upon perusal of the description of FIGS. 4*a*, 4*b* and 5.

The improved coupling device is installed in the space between the sidewall 4 of a first rack 2 and the sidewall 3 of a second rack 2. Its purpose is to transmit torque from the gear 20 on the shaft 18 of the first rack 2 to the gear 11 on the shaft 18 of the second rack 2. As mentioned above, the sidewalls 3, 4 of neighboring racks 2 are maintained at a predetermined distance d from one another when the racks are properly inserted into the vessel 1 of the developing machine, e.g., so that such racks occupy the positions I, II or II, III of FIG. 3.

As can be seen in FIGS. 4*a* and 4*b*, that part of the shaft 18 of the right-hand rack 2 which extends through a combined bearing and seal 3*a* of the respective sidewall 3 includes a first portion 18*a* at one side of the gear 11 and a second portion 18*a'* of identical length at the other side of the gear 11. The gear 20 is coaxial or substantially coaxial with the gear 11 of FIGS. 4*a* and 4*b*; it will be noted that the gear 20 is adjacent to but spaced apart from the end face of the shaft portion 18*a'* which latter has a recess 18*b* in the form of a circumferential groove.

The coupling device further comprises an elongated sleeve 19 having a cylindrical shell 19*a*, an elongated two-piece internal gear 19*b* at the inner side of the shell 19*a*, an annular disc-shaped or washer-like partition 19*d* in the interior of the shell 19*a*, and a set of three equidistant radially inwardly extending projections in the form of elastically deformable prongs or arms 19*e* each having an arcuate end portion 19*f* receivable in the groove 18*b* when the sleeve 19 assumes the (first) position shown in FIG. 4*a*, namely, when the left-hand portion of the internal gear 19*b* meshes with the gear 20. The right-hand portion of the internal gear 19*b* is in permanent mesh with the gear 11. The axial length of the sleeve 19 equals or approximates the combined axial length of the shaft portions 18*a*, 18*a'* and gear 11, and the distance between the partition 19*d* and the left-hand end of the sleeve 19 (i.e., the axial length of the left-hand portion of the internal gear 19*b*) equals or approximates the axial length of the gear 20. The axial length of the shaft portion 18*a* preferably equals or closely approximates the axial length of the shaft portion 18*a'*, i.e., the gear 11 is disposed substantially midway between the sidewall 3 of the right-hand rack 2 and the tip of the shaft portion 18*a'*.

The exterior of the shell 19*a* of the sleeve 19 is preferably provided with a ring-shaped collar 19*c* which can be knurled, milled or otherwise roughened and serves as a handgrip means for convenient shifting of the sleeve 19 between the first position of FIG. 4*a* and a second position which is shown in FIG. 4*b* and in which the shorter portion of the internal gear 19*b* (namely, the portion to the left of the partition 19*d*) is out of mesh with the gear 20. This renders it possible to lift the left-hand or the right-hand rack 2 out of the vessel 1 without any interference on the part of the sleeve 19. Axial shifting of the sleeve 19 from the position of FIG. 4*a* to the position of FIG. 4*b* entails automatic extraction or expulsion of arcuate portions 19*f* of the elastic prongs 19*e* from the groove 18*b*; the arcuate portions 19*f* then slide along the peripheral surface of the shaft portion 18*a'* in a direction toward the gear 11 and their bias suffices to ensure that the sleeve 19 remains in the position of FIG. 4*b* unless intentionally shifted back to the first position of FIG. 4*a*. In such first position, the arcuate portions 19*f* extend into the groove 18*b* and thus hold the sleeve 19 against accidental movement back toward or to the position of FIG. 4*b*. That part of the shaft portion 18*a'* which defines the groove 18*b* can be said to constitute the female detent element and the prongs 19*e* can be said to constitute the male detent element of a holding means which is designed to releasably retain the sleeve 19 in the first position of FIG. 4*a* and which can also serve to releasably hold the sleeve 19 in the position of FIG. 4*b* because the elasticity of prongs 19*e* can be readily selected in such a way that the frictional engagement of their arcuate portions 19*f* with the peripheral surface of the shaft portion 18*a'* suffices to prevent unintentional wandering of the sleeve 19 away from the position of FIG. 4*b*. The arrangement may be such that the sleeve 19 comes to rest in the second position of FIG. 4*b* when it strikes against the outer side of the sidewall 3 of the right-hand rack 2 or when the elastic prongs 19*e* strike against the left-hand end face of the gear 11.

FIG. 5 shows the sleeve 19 as seen from the left-hand side of FIG. 4*a* or 4*b*. It will be noted that the neighboring prongs 19*e* are separated from each other by relatively narrow radially extending clearances so that their arcuate projections 19*f* form an almost complete ring around the shaft portion 18*a'*.

The improved coupling device is operated as follows:

Referring again to FIG. 3, the leftmost rack 2 is inserted into the vessel 1 (position I) in the aforedescribed manner so that the marginal portions of the sidewall 3 enter the grooves 25*a* and the marginal portions of the sidewall 4 enter the leftmost grooves 25*b* of the partitions 24. This automatically places the gear 11 of the leftmost rack 2 into mesh with the gear 17. In the next step, the second rack 2 is inserted in the position II in such a way that its left-hand sidewall 3 is disposed at the aforementioned distance d from the right-hand sidewall 4 of the leftmost rack 2. The centering pin 21 of the leftmost rack 2 extends into the bore 22 of the sidewall 1*a* of the vessel 1, and the left-hand end portion of the centering pin 21 of the second rack 2 is introduced into the socket 22' in the head 23 of the centering pin 21 of the left-hand rack. The sleeve 19 on the gear 11 of the median rack 2 is held in its second position (nearest to the left-hand sidewall 3 of the median rack 2 so that the sleeve does not interfere with introduction of the median rack into the compartment between the partitions 24 at the distance d from the right-hand sidewall 4 of the left-hand rack. In the next step, the sleeve 19 is shifted from its second to its first position so that the internal gear 19*b* meshes with the gear 20 of the left-hand rack 2, and this completes the establishment of a torque transmitting connection from the gear 17 to the gear 11 of the median rack 2. In the embodiment which is shown in FIG. 3, the width of the second or median rack (in the position II) exceeds the width of the rack 2 in the position I. The third or rightmost rack 2 of FIG. 3 is inserted to assume the position III in the same way as described for the rack in the position II, i.e., the centering pins 21 of the racks in the positions II and III are coupled to each other and the sleeve 19 on the gear 11 of the rightmost rack is then shifted in a direction to the left to connect its internal gear 19*b* with the gear 20 at the outer side of the right-hand sidewall 4 of the median rack 2. The width of the rack 2 which occupies the position III may but need not be the same as that of the rack in the position I or II. Also, the third rack can be followed by one or more additional racks, depending on the desired number of strips or sheets which are to be transported through the vessel at the same time, i.e., along separate paths each of which is defined by a discrete rack 2.

It will be readily appreciated that each compartment of the vessel 1 receives a set of racks 2 in the same distribution and of the same size as those in the illustrated compartment. This ensures that the photographic material which is treated by the developing solution in the illustrated compartment will be treated by a fixing agent in the next-following compartment, by a rinsing fluid in a third compartment, and so forth depending upon the nature and number of required treatments.

The length of each rack 2 may but need not be the same. Otherwise stated, all of the racks need not define paths of identical length. For example, it can happen that a certain photosensitive material should be treated by the developing solution for a first interval of time and a different photosensitive material should be treated by the same developing solution for a different second interval of time. If the second interval is shorter, the corresponding rack 2 defines a shorter path to ensure that the interval of dwell of the respective material in the compartment shown in FIG. 3 is shorter. The different photosensitive materials may have the same width or different widths; this will determine the selection of wider or narrower racks. The desired interval of contact between the photosensitive material and the bath in a particular compartment will determine the length of the selected rack. It will be noted that, even though the improved coupling device is designed to transmit torque in such a way that the associated gears 11 and 20 are driven at the same speed, i.e., that the utilization of the improved coupling device does not allow for or necessitate transport of photosensitive material through neighboring racks at different speeds (this is the conventional mode of ensuring that different types of photosensitive material will dwell in a particular fluid for required (different) intervals of time), the developing machine is still capable of simultaneously treating two or more materials which require different periods of dwell in the baths by the simple expedient of using racks which define longer or shorter paths for the photosensitive materials of corresponding width. It has been found that the developing machine which employs the improved coupling device can simultaneously treat a wide variety of photosensitive materials (namely, materials of different widths as well as materials which require different intervals of dwell in certain baths) by the simple expedient of using racks of different widths and/or racks defining paths of different lengths. The periods of idleness of the machine during conversion from treatment of first types of materials to treatment of second types of materials are surprisingly short because the coupling devices can be disengaged with little loss in time, i.e., all that is necessary to allow for separation of two interconnected racks 2 is to shift the corresponding sleeve 19 to the position of FIG. 4*b* and the coupling is operative as soon as the sleeve 19 is returned to the position corresponding to that shown in FIG. 4*a*.

The improved coupling device exhibits many other important advantages. Thus, the dimensions of the sleeve 19 can be readily selected in such a way that the internal gear 19*b* can establish a proper torque transmitting connection between two gears 11, 20 which are not in exact axial alignment with one another, either due to machining tolerances or due to deviations of mutual spacing of grooves 25*a*, 25*b*, 25*c* from an optimum spacing. The shifting of the sleeve 19 between its first and second positions requires a minimum of effort, and such sleeve can be made of any one of a variety of readily available inexpensive materials, e.g., a synthetic plastic substance. As mentioned above, the shell 19*a*, the partition 19*d* and the prongs 19*e* of each sleeve 19 can form an integral unit which is made by injection molding or another suitable technique for the processing of synthetic plastic materials. Moreover, the sleeve 19 automatically remains in either of the two positions so that it cannot accidentally block the insertion of a rack into or the withdrawal of a rack from the vessel 1 when such insertion or withdrawal is desired, and also that the sleeve reliably establishes a torque transmitting connection between two coaxial or substantially coaxial shafts 18 when the holding means maintains the sleeve in the position of FIG. 4*a*. The coupling device is close to the top of the vessel 1 so that it is within easy reach, and the shifting of sleeve 19 between the positions of FIGS. 4*a* and 4*b* can be carried out by hand. The sleeve 19 is not likely to be detached from the respective shaft portion 18*a'*, even if the neighboring rack 2 is removed from the bath or even if the rack carrying the sleeve 19 is lifted out of the vessel 1, because the prongs 19*e* are in frictional engagement with the peripheral surface of the shaft portion 18*a'* when their arcuate portions 19*f* do not extend into the corresponding groove 18*b*.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of our contribution to the art and, therefore, such adaptations should and are intended to be comprehended within the meaning and range of equivalence of the appended claims.

We claim:

1. A coupling device for use in developing machines for photosensitive material, comprising at least substantially coaxial first and second shafts; first and second gears provided on the respective shafts, said first shaft including a portion extending beyond said first gear and toward said second shaft; a sleeve having an internal gear meshing with said first gear and being movable between first and second positions in which said internal gear respectively meshes with and is out of mesh with said second gear; and means for releasably holding said sleeve in said first position, said holding means including male and female detent elements, one of said elements being provided in said sleeve and the other of said elements being provided on said portion of said first shaft, said male and female detent elements being in engagement with one another in the first position of said sleeve.

2. The coupling device of claim 1, wherein the pitch diameter of said internal gear matches or closely approximates the pitch diameters of said first and second gears.

3. The coupling device of claim 1, further comprising a first transporting unit having a wall rotatably supporting said first shaft so that the first gear is disposed externally of said transporting unit, and a second transporting unit having a wall rotatably supporting said second shaft so that said second gear is disposed externally of said second transporting unit, said sleeve being disposed between the walls of said first and second transporting units.

4. The coupling device of claim 1, wherein said sleeve is a hollow cylinder.

5. The coupling device of claim 1, wherein said first shaft further comprises a second portion at one side of said first gear and said first mentioned portion of said first shaft is located at the other side of said first gear, the combined axial length of said portions of said first shaft and of said first gear being equal to or approximating the axial length of said sleeve.

6. The coupling device of claim 5, further comprising a wall rotatably mounting said first shaft, said portions of said first shaft being disposed at one side of said wall and said sleeve being respectively remote from and close to said wall in said first and second positions thereof.

7. The coupling device of claim 5, wherein the axial length of said first mentioned portion equals or approximates the axial length of said second portion of said first shaft.

8. The coupling device of claim 1, wherein said male detent member includes at least one springy projection provided in said sleeve and tending to move radially inwardly, said female detent element being provided on said portion of said first shaft.

9. The coupling device of claim 8, wherein said holding means comprises a plurality of springy projections in said sleeve.

10. The coupling device of claim 1, wherein said sleeve consists, at least in part, of a synthetic plastic material.

11. The coupling device of claim 10, wherein said one detent element is integral with said sleeve.

12. The coupling device of claim 11, wherein said holding means further comprises an annular internal partition in said sleeve and said one detent element includes at least one elastically deformable prong provided on said partition and extending radially inwardly toward the axis of said sleeve.

13. The coupling device of claim 1, wherein the axial length of said first gear equals or approximates the axial length of said second gear.

14. A coupling device for use in developing machines for photosensitive material, comprising at least substantially coaxial first and second shafts; first and second gears provided on the respective shafts; a sleeve having an internal gear meshing with said first gear and being movable between first and second positions in which said internal gear respectively meshes with and is out of mesh with said second gear, said sleeve having an internal partition disposed between said first and second gears, said internal gear having a first portion of first axial length disposed at one side of said partition and meshing with said first gear, and a second portion of lesser axial length disposed at the other side of said partition and meshing with said second gear in the first position of said sleeve; and means for releasably holding said sleeve in said first position.

15. The coupling device of claim 14, wherein said first shaft includes a portion extending beyond said first gear and toward said second shaft, said holding means including male and female detent elements, one of said elements being provided in said sleeve and the other of said elements being provided on said portion of said first shaft, said male and female detent elements being in engagement with one another in the first position of said sleeve.

16. The coupling device of claim 14, wherein said second axial length equals or approximates the axial length of said second gear.

17. The coupling device of claim 14, wherein said first gear is in permanent mesh with the first portion of said internal gear.

18. The coupling device of claim 14, wherein the extent of axial movement of said sleeve between the first and second positions thereof equals or slightly exceeds the axial length of said second gear.

19. A coupling device for use in developing machines for photosensitive material, comprising at least substantially coaxial first and second shafts; first and second gears provided on the respective shafts; a sleeve having an internal gear meshing with said first gear and being movable between first and second positions in which said internal gear respectively meshes with and is out of mesh with said second gear; and means for releasably holding said sleeve in said first position, including at least one elastically deformable prong provided in said sleeve and tending to move radially inwardly, said first shaft having a portion provided with a recess which receives a portion of said prong in the first position of said sleeve.

20. The coupling device of claim 19, wherein said holding means comprises several elastically deformable prongs provided in said sleeve, said recess constituting a circumferentially complete groove in the peripheral surface of said portion of said first shaft and said prongs having arcuate portions extending into said groove in the first position of said sleeve.

* * * * *